United States Patent [19]

Brown

[11] 4,439,002
[45] Mar. 27, 1984

[54] ONE-PIECE FOLDABLE KALEIDOSCOPE KIT
[75] Inventor: Lyman J. Brown, Oak Brook, Ill.
[73] Assignee: Bates Printing Specialties, Inc., Cicero, Ill.
[21] Appl. No.: 408,513
[22] Filed: Aug. 16, 1982
[51] Int. Cl.³ ............................................. G02B 23/00
[52] U.S. Cl. ..................................................... 350/4.1
[58] Field of Search ........................ 350/4.1, 4.2; 353/1
[56] References Cited
U.S. PATENT DOCUMENTS 3,111,878 11/1963 Welles et al. ......................... 350/4.2
3,923,368 12/1975 Hassel .................................... 350/4.1
4,040,716 8/1977 Matsubara ............................. 350/4.1

Primary Examiner—Richard A. Wintercorn
Attorney, Agent, or Firm—Kinzer, Plyer, Dorn & McEachran

[57] ABSTRACT

A one-piece foldable kaleidoscope kit is provided which is easily assembled, compact, and inexpensive. The kit includes a viewing tube removably attached to a panel. The viewing tube has a reflective inner surface and is flattenable. The panel has two parts and it may be folded to hold the flattened viewing tube between the two parts of the panel so that the folded kit is substantially flat. Means for temporarily sealing the folded kit are provided. The panel also includes a design which may be viewed through the viewing tube after the tube has been removed from the panel.

5 Claims, 4 Drawing Figures

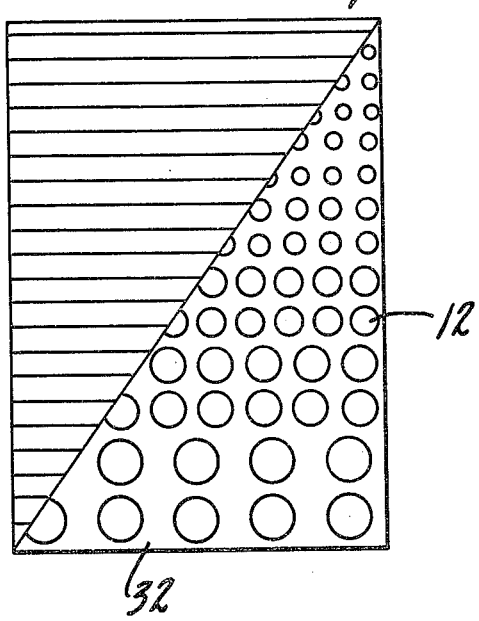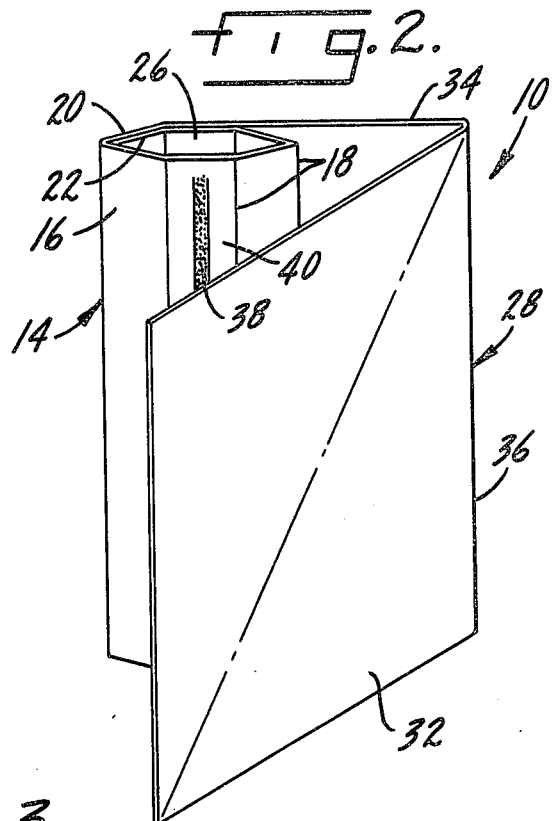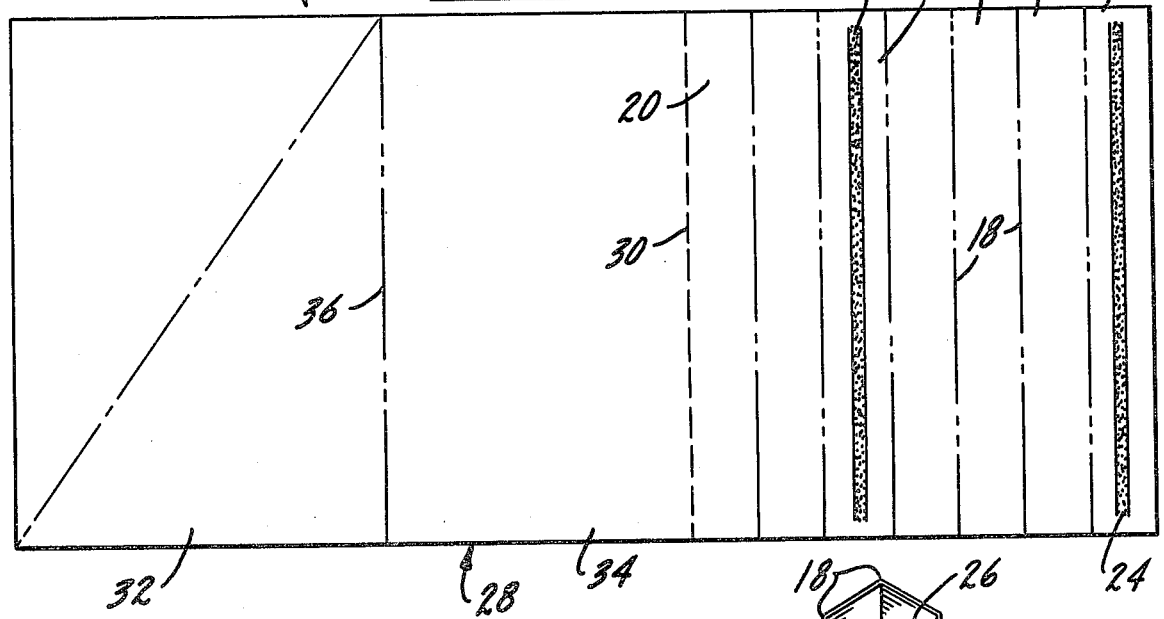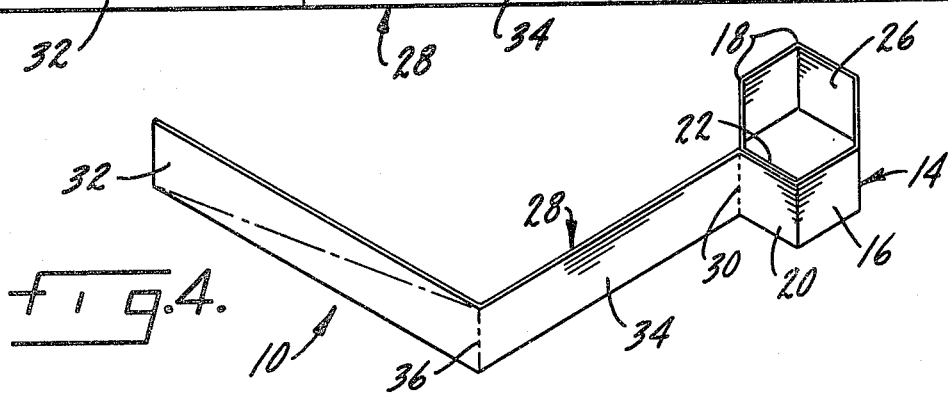

4,439,002

ONE-PIECE FOLDABLE KALEIDOSCOPE KIT

SUMMARY OF THE INVENTION

This invention concerns premium or novelty items useable in advertising and promotional campaigns and the like. It more particularly concerns an inexpensive kaleidoscope kit that could, for example, be used as a promotional item in a breakfast cereal box.

An object of this invention is to provide an inexpensive premium or novelty item useable in advertising and promotional campaigns.

Another object is to provide an inexpensive onepiece foldable kaleidoscope kit useable as such an item.

Another object is to provide such a kaleidoscope kit that is capable of being folded so that it is substantially flat, to allow for compact storage, packaging, and shipping of the kits.

Another object is to provide such a kit that has a viewing tube formed during manufacture so that the user may easily assemble the kit.

Other objects may be found in the following specification, claims and drawings.

BRIEF DESCRIPTION OF THE DRAWINGS

The invention is illustrated more or less diagrammatically in the following drawings wherein:

FIG. 1 is a front view of the kaleidoscope kit of this invention in a flat, folded condition;

FIG. 2 shows an unfolded kaleidoscope kit;

FIG. 3 is a plan view of an unassembled kaleidoscope kit;

FIG. 4 is a top perspective view of an assembled, unfolded kaleidoscope kit before separation of the kaleidoscope.

DESCRIPTION OF THE PREFERRED EMBODIMENT

FIG. 1 of the drawings shows a one-piece foldable kaleidoscope kit 10 embodying the novel features of this invention. The entire kit is made of an inexpensive paper stock. A colorful design 12 is printed on part of the kit. A user may view the design through a viewing tube 14 included as part of the kit.

The kit embodies a novel construction that allows it to be easily folded and compactly stored and packaged, while minimizing the work involved in assembly of the kit. To assemble the kit, the user simply unfolds it and removes the viewing tube. To view the design, the user holds one end of the tube to his eye and holds the other end of the tube above the design 12. The design forms a symmetrical pattern in the tube. This pattern is viewed by the user.

As shown in FIG. 2, a plurality of parallel strips 16 form the viewing tube 14. These strips are defined by fold lines 18 made in a single piece of paper stock. The paper stock is folded to form the strips. The strips are then shaped into a tube, and the end strips are bonded together to complete the viewing tube. In the preferred embodiment, the paper stock is folded to form seven similarly-shaped strips. These strips are shaped into a tube, and the first strip 20 is bonded to the seventh strip 22 by adhesive means 24 to complete the preferred viewing tube. Thus, the preferred viewing tube is hexagonal in cross-section when expanded.

To be functional as a kaleidoscope, the viewing tube 14 must have a reflective inner surface 26. To make it reflective, the inner surface 26 of the viewing tube 14 may be lined with a thin metal foil. But, in the preferred embodiment, the inner surface 26 of the viewing tube 14 is made reflective by printing it with a gloss black ink which is coated with a lacquer.

It should be noted that the viewing tube 14 is preformed, that is, completed during manufacture. The user need not bond the strips together to form the tube; he need only tear the pre-formed viewing tube 14 from the panel 28. Thus, pre-forming the viewing tube facilitates the user's assembly of the kit. In forming the viewing tube, the manufacturer may select the adhesive means 24 in accordance with the type of material used and other manufacturing considerations.

Even though the viewing tube 14 if pre-formed, this kaleidoscope kit may be simply and compactly stored, packaged, and shipped because the viewing tube 14 is flattenable. By applying a compressive force to opposite strips 16 of the viewing tube 14, it may be flattened for storage, packaging, and shipping. By applying a small amount of force along the fold lines 18 of the flattened viewing tube, it may be expanded until it is substantially hexagonal in cross-section, for use in viewing the design 12 on the panel 26. The viewing tube will also tend to expand until it is substantially hexagonal in cross-section because a spring-action exists along the fold lines 18 between the strips 16.

As indicated, the user may assemble the kaleidoscope kit 10 quickly and easily by unfolding the kit and then separating the viewing tube 14 from the panel 28. To facilitate their separation, the viewing tube and the panel are removably connected by a perforated or interrupted-cut line 30. Thus, the viewing tube and the panel may be held together during storage and packaging, while they may be easily separated along the line 30 when assembled for use.

It should be noted that the preferred construction depicted in FIGS. 1 through 4 allows the manufacturer to make the entire kaleidoscope kit 10 from one elongated, rectangular piece of material. Many types and qualities of paper stock are suitable materials for this kit. However, the preferred material is a solid bleached sulfite.

The panel 28 has two parts, a first part 32 and a second part 34 defined by a fold line 36, the second part 34 being connected to the viewing tube 14 by the perforated or interrupted-cut line 30. The two parts may be folded along the fold line 36 to form a substantially flat rectangle when the two parts of the panel are folded flat against each other and the flattened viewing tube is held between the folded panels.

To maintain the kit in this folded condition, means for temporarily sealing the folded kit should be provided. This temporary sealing means should be capable of being broken without damaging the kit. In the preferred embodiment, the temporary sealing means comprises a line of adhesive material 38 deposited on the third strip 40 of the viewing tube 14. This adhesive material 38 will adhere to the first part 32 of the panel 28 when the kaleidoscope kit 10 is folded. The type of adhesive material used as a temporary sealing means may be selected in accordance with manufacturing considerations and the paper stock used.

The panel 28 also includes a design 12 formed on at least one of the parts of the panel. As shown in the preferred embodiment, the design 12 is applied to one face of the first part 32 of the panel 28. If a greater variety of designs is desired, both faces of one part of the panel may have designs applied thereto, or both parts of the panel may have designs applied thereto. The designs themselves may vary a great deal—the design shown in FIG. 1 is illustrative only.

The design 12 may be graphically applied to the panel 28, as by printing. It may be applied in multi-colors, for example, by using a conventional four-color printing process. However, it may also be applied by any of the other conventional methods known to those in the graphic arts.

Instructions for assembly and use of the kaleidoscope kit may also be printed on the panel 28. In the preferred embodiment, the instructions are printed on the outer face of the second part 34 of the panel 28 so that they may be read when the kit is folded and sealed. Since the application of the printed instructions to the panel is conventional, it is not shown in the drawings.

To make the preferred kaleidoscope kit, the manufacturer cuts the perforated or interrupted-cut line 30 into the piece of sulfite and forms the fold lines 36, 18 which define the two parts of the panel and those which define the strips of the viewing tube. The first strip 20 and the seventh strip 22 are permanently bonded together by the adhesive means 24 to form the viewing tube 14. The viewing tube is flattened and then sandwiched between the two folded parts of the panel 28. The folded kit is then placed in the commodity to be promoted, as for example, in a breakfast cereal box. Upon receipt, the user reads the instructions, breaks the seal, and unfolds the kaleidoscope kit, as shown in FIG. 4. The user then removes the viewing tube 14 from the second part 34 of the panel 28, holds one end of the viewing tube to his eye, and holds the other end of the viewing tube over the design 12 of the panel 28. The design will form a symmetrical pattern on the reflective inner surface 26 of the viewing tube. The patterns will vary as the user moves the viewing tube and the design relative to each other. Thus, the user may view a variety of patterns through the viewing tube.

As has been shown, assembly of this kaleidoscope kit by the user is quick and easy because the viewing tube is completed during manufacture. Because the completed viewing tube is flattenable, the kaleidoscope kit may be folded so that it is substantially flat. Because the folded kits are flat, they may be compactly stored, packaged, and shipped. Thus, the disclosed kaleidoscope kit presents a unique combination of easy-assembly and compactness. Combined with its low cost, these features make the disclosed kaleidoscope kit particularly useful as a premium or novelty item in advertising or promotional campaigns.

The invention has been described in detail with particular reference to preferred embodiments thereof, but it will be understood that variations and modifications can be affected within the sprit and scope of the invention.

I claim:

1. A one-piece kaleidoscope kit in the form of a multi-layered prefolded packet having a first section and second section joined by a fold line, a portion of the second section being divided into a plurality of strips beginning at the end of the second section distal from the fold line,
   the most distant strip being folded and adhered to the strip closest to the fold line to form a flattened multi-panel tube,
   the tube being folded flat between the first and second sections to form the packet,
   a perforated tear line formed in the second section to separate the plurality of strips from the remainder of the second section,
   a reflective surface formed on corresponding sides of the plurality of strips which form the interior of the folded flattened tube, and
   means connecting the first panel to one of the strips of the tube to form the prefolded packet.

2. The one-piece kaleidoscope kit of claim 1 in which the reflective inner surface formed on the corresponding sides of the strips is a gloss black ink coated with a lacquer.

3. The one-piece kaleidoscope kit of claim 1 in which the means for joining the first section to one of the strips of the tube to seal the packet is a line of easily breakable adhesive.

4. The one-piece kaleidoscope kit of claim 1 in which a colorful design is printed on one of the first and second sections to be viewed through the multi-panel tube.

5. The one-piece kaleidoscope kit of the claim 1 in which the multi-panel tube includes seven similar strips in which the first and seventh strips are permanently fastened together by adhesive means so the viewing tube is hexagonal in cross-section when the viewing tube is expanded from its flattened condition.

* * * * *